United States Patent
Pärssinen

(10) Patent No.: US 11,383,404 B2
(45) Date of Patent: Jul. 12, 2022

(54) COMPRESSED ARTICLES AND METHODS OF MANUFACTURING THE SAME

(71) Applicant: Woodio Oy, Helsinki (FI)

(72) Inventor: Antti Pärssinen, Helsinki (FI)

(73) Assignee: Woodio Oy, Helsinki (FI)

( * ) Notice: Subject to any disclaimer, the term of this patent is extended or adjusted under 35 U.S.C. 154(b) by 73 days.

(21) Appl. No.: 16/348,211

(22) PCT Filed: Nov. 8, 2017

(86) PCT No.: PCT/FI2017/050769
§ 371 (c)(1),
(2) Date: May 8, 2019

(87) PCT Pub. No.: WO2018/087428
PCT Pub. Date: May 17, 2018

(65) Prior Publication Data
US 2019/0322002 A1    Oct. 24, 2019

(30) Foreign Application Priority Data

Nov. 8, 2016  (FI) .................................... 20165839

(51) Int. Cl.
*B27N 3/00* (2006.01)
*B27N 1/00* (2006.01)
*B27N 3/02* (2006.01)

(52) U.S. Cl.
CPC ............. *B27N 3/002* (2013.01); *B27N 1/006* (2013.01); *B27N 3/02* (2013.01)

(58) Field of Classification Search
None
See application file for complete search history.

(56) References Cited

U.S. PATENT DOCUMENTS

| | | | |
|---|---|---|---|
| 3,206,201 A | 9/1965 | Hendricks | |
| 5,948,524 A | 9/1999 | Seethamraju et al. | |
| 2001/0021447 A1 | 9/2001 | Willemse et al. | |
| 2003/0024443 A1 | 2/2003 | Hoshi | |
| 2003/0046772 A1 | 3/2003 | Halahmi et al. | |
| 2006/0284332 A1 | 12/2006 | Matsufuji et al. | |
| 2007/0267609 A1 | 11/2007 | Ratzsch et al. | |
| 2009/0174109 A1 | 7/2009 | Ratzsch et al. | |
| 2013/0000248 A1 | 1/2013 | Semenivskyi et al. | |
| 2015/0224537 A1 | 8/2015 | Palaikis et al. | |
| 2016/0136913 A1 | 5/2016 | Hannig | |
| 2016/0250063 A1 | 9/2016 | Pärssinen | |

FOREIGN PATENT DOCUMENTS

| | | | |
|---|---|---|---|
| CN | 105235048 A | 1/2016 | |
| CN | 105751345 A | 7/2016 | |
| DE | 3345858 A1 * | 6/1985 | ............. C08L 63/00 |
| EP | 0277238 A1 | 8/1988 | |
| EP | 2777238 B1 | 7/2018 | |
| JP | S61130004 A | 6/1986 | |
| JP | H05331250 A | 12/1993 | |
| JP | 3055974 B2 | 6/2000 | |
| JP | 2002036213 A | 2/2002 | |
| JP | 2014008617 A | 1/2014 | |
| SU | 387847 A1 * | 6/1973 | |
| SU | 923808 A1 * | 4/1982 | |

OTHER PUBLICATIONS

Derwent abstract of SU-923808-A1 (Year: 1982).*
Machine translation of DE-3345858-A1 (Year: 1985).*

* cited by examiner

*Primary Examiner* — Wenwen Cai
(74) *Attorney, Agent, or Firm* — Laine IP Oy

(57) ABSTRACT

A compressed article formed by a composite material comprising a thermoset polymer and a wood material, a method of producing the same and the use of the novel articles. The composite material has a continuous matrix of a hardened thermoset polymer and, distributed within the matrix, wood chips which are at least partially encased by the thermoset polymer, said article having a water absorbency of less than 1% by weight upon immersion into water over a time period of at least 168 h at room temperature. The articles can be used in structures that are frequently contacted with water.

10 Claims, No Drawings

COMPRESSED ARTICLES AND METHODS OF MANUFACTURING THE SAME

FIELD

The present invention relates to products formed by polymeric resins and wood materials. In particular, the present invention concerns compressed articles, methods of producing such articles and uses thereof.

BACKGROUND

Compressed composites of polymer and wood are known in the art. Such composites are represented by wood panels, wherein the structural part of the material is formed by wood in the form of thin sheets, such as veneer, or particles. Examples include plywood and particles boards and various fibers boards.

A conventional particle board is an engineered wood product made from wood chips, sawmill shavings, sawdust, synthetic resin or any suitable binders. Particle boards serve as a cheaper, denser and more uniform alternative than conventional wood and plywood material. Particle boards can serve as a substitution material when cost reduction is a primary consideration rather than the physical attributes like strength and appearance of the article to be produced.

One major disadvantage of known composites of polymers and wood is that they are prone to volume expansion and discoloration as a result of adsorption of moisture into the wood material. Lack of dimensional stability under the influence of moisture and water make wood panels, such as particle boards, unsuited for use in places where there are high levels of moisture are present. Therefore, for example conventional wood panels have to be protected by lamination or with paint or a sealer against water and moisture.

The conventional manufacturing method of particle boards is to form a plurality of layers of wood particles on a supporting surface, to spread adhesive resin over the layers and to compress the layers thus treated in a press by the use of heat for forming a compressed, hardened panel.

Various improvements in the field of particle boards are discussed in JP03055974B2, JP2014008617A, JP2002036213A and EP2777238. Further composite materials are disclosed in U.S. 2013000248 A1 and U.S. 2003046772 A1.

Layered structures of the above have poor peeling strength which means that the material will split under stress. When splitting occurs, the contact surface area is increased making it even more prone to absorption of water thus exacerbating the swelling of the article.

As apparent from the above, conventional compressed wood products are not suitable for use in articles which are subjected to contact with water.

SUMMARY OF THE INVENTION

It is an aim of the invention to provide a new compressed material suitable for use as a structural component or a building material in applications that may be subjected to exposure of water.

It is another aim to provide a method of producing compressed articles formed by resins and wood particles.

The present invention is based on the concept of providing a compressed article which is formed by a composite material which has a continuous matrix of a hardened thermoset polymer and wood particles distributed within the matrix. The wood particles are at least partially encased by the thermoset polymer.

It has been found that an article of the present kind has a water absorbency of less than 1% by weight upon immersion into water over a time period of at least 168 h (week) at room temperature.

A compressed article of the present kind can be obtained by blending wood chips with a liquid formed by unhardened thermoset resin to form a mixture, which is transferred to a compression mould having a receiving surface corresponding to the outer surface of the compressed article. The mixture is moulded in the mould while allowing for hardening of the resin and for forming a compressed article having at least one surface formed against the receiving surface.

The novel compressed articles can be used in structures and objects which may be contacted with moisture or water.

More specifically, the present invention is characterized by what is stated in the characterizing portions of the independent claims.

Considerable advantages are obtained by the present invention. Thus, it has surprisingly been found that the water absorption of the articles is small even when the surface of the articles is broken up to expose the inner parts of the articles. As a result, the present articles can be provided with apertures or bores without causing any significant swelling of the material. Water absorbency of the material making up the present moulded and compressed articles is typically less than 1% by weight even after one week of water contact at room temperature.

Typically, the wood particles are platy, and for example formed by wood chips. Such particles are, in embodiments of the invention, owing to their shape and form capable of self-organising into an interlocking, 3 dimensional structures on at least the outer surface of the mould during moulding.

Articles according to the present invention can be employed for manufacturing compressed articles which find use in the production of furniture and structural parts for indoor or outdoor use, in fixtures for kitchens and bathrooms, and on boats and similar floating vessels, for example for the manufacture of hulls. Since the compressed articles have good dimensional stability, they can be shaped into tiles for covering of surfaces, such as walls and floors.

Further features and advantages relating to particular embodiments of the present invention will appear from the following detailed description.

EMBODIMENTS

Definitions

In the present context, the term "wood chips" stands for particles of wood obtained by cutting or chipping of larger pieces of wood. The "wood chips" can vary in sizes and quality and they can be obtained from various sources. Typically, logs are used as a raw-material, but also other sources can be used, both virgin materials and recycled materials. Typically, the present particles, for example chips, have a sieved size in the range of 0.2 to 20 mm, in particular 0.3 to 10 mm. Thus, for example the particles, in particular chips, used can have a sieved size of 1 to 7.5 mm, depending for examples on the dimensions, in particular thicknesses, of the articles which are to be manufactured.

In the present context, the term "compressed article" stands for an article that has been flattened by pressure, or which has been squeezed or pressed.

"Thermosetting resin" is a polymeric substance that changes irreversibly into an insoluble polymer network typically by cross-linking during a process referred to as "curing" to form a "thermoset polymer". In the present context it is preferred to provide a thermosetting resin which is, as such, liquid at room temperature, or which is capable of forming a liquid phase at room temperature, e.g. by the action of a solvent. Conventionally, the thermosetting resin can be characterized as a prepolymer, which has a lower molecular weight than the material obtained by curing thereof.

"Room temperature" stands for a temperature in the range of 10 to 30° C., in particular 15 to 25° C.

"Curing" is a process that transforms a thermosetting resin into a hardened thermoset material ("thermoset polymer") by cross-linking of individual chains of the polymeric substance of the resin under the influence of heat or suitable radiation, often under increased pressure, or by the use of hardeners.

Hardeners are typically substances which achieve cross-linking of the chains of the polymeric substance. Examples of hardeners include compounds containing reactive groups selected from the group of epoxy groups, amine groups, vinyl groups and allyl groups and combinations thereof. Also unsaturated compounds, with one or several unsaturated bonds in the main chain of the molecule, can be used as hardeners. Such compounds can optionally have reactive groups of the kind mentioned in the foregoing. Independent on the cross-linking process, it can be facilitated by catalysts at chemically active sites.

"Relative humidity" is defined as the ratio of the partial pressure of water vapour in a mixture of air and water to the equilibrium vapour pressure of water over a flat surface of pure water at a given temperature. Relative humidity is normally expressed as a percentage representing the ratio of the actual water vapour pressure to the saturation vapour pressure so that a higher percentage means that the air-water mixture is more humid.

As appears from the above, a compressed article according to the present technology is in particular formed by a composite material which comprises at least two components, viz. a thermoset polymer and a wood material, the latter being provided in the form of wood particles. In the compressed article, the thermosetting resin forms, after hardening into a thermoset polymer, a continuous matrix. Distributed within that matrix there are the wood particles, in particular in the form of wood chips or other platy particles, which are at least partially encased by the thermoset polymer. Typically, the polymeric part of the compressed article forms more than 30%, in particular 40 to 95%, by volume of the article. In particular, the polymeric part of the compressed articles forms more than 50% and up to 90% by volume of the article.

One aspect of the invention is that the amount of wood chips that is contained in the composite material is 1 to 60 parts by weight, in particular 10 to 40 parts by weight, for example about 25 to 35 parts by weight, per 100 parts by weight of hardened thermoset polymer.

The volume of the wood chips that are encased by the thermoset polymer within the thermoset polymer matrix is at least 20% by volume, in particular 30 to 100% by volume.

The article has low water absorbency. In particular, the water absorbency is less than 2% by weight, or even less than 1% by weight, upon water contact, for example immersion into water, over a time period of at least 72 h, in particular one week (168 h) at room temperature.

In one embodiment, the composite material consists essentially of at least one thermoset polymer forming a matrix with wood particles, in particular wood chips, which preferably are embedded fully or partially within the polymer matrix. Thus, more than 95% by weight of the material is formed by the two components discussed above.

In another embodiment, the composite material contains additionally other components. Thus, there can be present fillers which add to the strength properties. Additives can be added to the mixture before moulding to improve the structural properties of the material, with additives, such as hardener, where cross-linking can strengthen the elasticity of the thermoset resin.

For the production of the compressed article, wood particles and a thermosetting resin are combined to give a mixture, which then is given a predetermined shape during compression of the mixture, while hardening of the resin. Typically, the mixture is given the shape determined by the moulding surface. One suitable process for moulding the mixture is known as compression moulding.

Thus, in one embodiment wood chips are admixed with the thermosetting resin to form a polymer-chips mix which is moulded under pressure and optionally heated to form a compressed article. When forming the mix, the liquid resin and the wood chips are thoroughly mixed to achieve even distribution of the wood chips in the liquid phase.

In one embodiment wood chips are distributed throughout the polymer matrix of the composite material. Typically, a majority of the individual wood chips within the composite material matrix are then covered with the thermoset polymer and preferably at least partially impregnated with it.

In one embodiment, a method of producing an article according to any of the above embodiments comprises the steps of blending wood chips with a liquid formed by unhardened thermoset resin at a weight ratio of 1:100 to 60:100, for example 5:100 to 50:100, to obtain a uniform mixture; transferring the mixture into a compression mould having a receiving surface corresponding to the outer surface of the compressed article; and moulding the mixture in said mould to form a compressed article having at least one surface formed against the receiving surface.

In another embodiment, the method comprises blending wood chips with a liquid formed by unhardened thermoset resin at a weight ratio of 10:100 to 40:100 to obtain a uniform mixture; transferring the mixture into a compression mould; and moulding the mixture in said mould at a temperature of less than the boiling point of water and under conditions which allow for the chips to form a 3-dimensional structure of interlocking chips within the thermoset resin during compression.

The choice of wood chips used in the making of the compressed material can be of any type but typically the wood chips have a sieved size of 1 to 7.5 mm or 0.5 to 5 mm, respectively. The sieve size of the wood chips may influence the amount of water being absorbed and the corresponding degree of swelling in the wood chips.

In one embodiment, the wood chips have a moisture content of less than 20% by weight, in particular less than 18% by weight, typically less than 15% by weight, for example less than 10% by weight. In one embodiment, the wood chips have a moisture content of less than 8% by weight, for example less than about 6%, such as about 0.1 to 5% by weight. As discussed below, the wood chips can be thermally treated before use. In addition to the other effects attainable, such treatment will also reduce the humidity of the chips.

The wood chips that can be used in the invention can be of any type but they are preferably selected from the group of coniferous and deciduous wood chips and combinations thereof. In particular, the chips are porous. In one embodiment, the chips are chips of aspen, alder or pine or combinations thereof.

Typically, the chips are at least partially encased by the resin. Since the resin is used in liquid phase and the wood material typically is porous, such as is the case of chips obtained by chipping of aspen, poplar or spruce, at least partial impregnation of the chips with liquid resin can be achieved prior to final hardening of the resin.

The thermoset polymer matrix that encases the wood chips essentially comprises hardened thermosetting resin. The resin can be of any type such as a polyester resin, in particular an aromatic polyester resin, or an epoxy resin or a urea formaldehyde resin or melamine formaldehyde resin or melamine urea-formaldehyde resin. Combinations of thermosetting resins can be used as well.

Examples of suitable polyester resins include products marketed under the trade marks Basonat®, Novolac®, Polylite® and Waterpoxy®.

The thermosetting resin can have components modifying its properties. In order to improve its fire resistance, inorganic substances, such as triphenyl phosphate and antimony trioxide, can be added as flame retardant additives. It is also possible to incorporated into the polymer monomers selected from halogenated dibasic acids and acid anhydrides, such as tetrachlorophthalic anhydride, tetrabromophthalic anhydride, dibromoneopentyl glycol and tetrabromo bisphenol-A. Such monomers can optionally be used as monomers in place of phthalic anhydride or propylene glycol.

As discussed above, a curing agent can admixed with the resin to achieve curing. Thus, based on 100 parts by weight of the resin, 0.1 to 10 parts by weight of a curing agent selected from the group of epoxy groups, amine groups, vinyl groups and allyl groups and combinations thereof, can for example be added.

Further, to initiate or to accelerate the curing, a catalyst can also be added. One embodiment provides for the use of an accelerator containing peroxo groups, such as an organic or inorganic peroxide. A particularly preferred peroxide compound is methyl (ethyl) ketone peroxide for example provided in the form of a solution which can be added in an organic solvent to the resin or to the mixture of the resin and any curing agent, optionally in the presence of admixed wood particles. Examples of commercially available MEKP products include products marketed under the trade names Butanox, Chaloxyd, Di-Point, Kaymek, Ketonox, Lucidol, Luperox, Norox, Peroximon and Superox.

By the addition of a catalyst, curing can be initiated or even achieved already at room temperature. Typically, the catalyst is added at 0.1 to 5 parts by weight per 100 parts by weight of resin together with any hardening agent. In the case of unsaturated polyester resins, typically no separate hardener is needed and curing is reached with the addition of a peroxide catalyst.

In an embodiment, a method is provided in which the mix of thermosetting resin and wood particles is hardened in the mould by catalyst activation at room temperature. In particular, in one embodiment, wood chips are admixed with an unsaturated polyester resin, provided in liquid form, and a peroxide hardener at room temperature to form a mixture In another embodiment, a method is provided in which the mix of thermosetting resin and wood particles is hardened in the mould at a temperature of 30 to 75° C.

The above embodiments can be carried out by transferring the mixture to a compression mould where it is compressed at a temperature of 20 to 50° C. and a pressure of about 10 to 1000 kN, typically at 50 to 750 kN, to form a compressed article.

According to one embodiment, the compressed material comprises wood chips that are platy in form and when the moulding is carried out against a planar mould surface, the platy chips will organize within the material such that they overlap at least partially to form an essentially planar layer which overlapping chips interlocking to give a three-dimensional structure within the material.

The wood material can be pre-treated before it is admixed with a resin. Thus, for example, the material can be subjected to heat modification. Such heat modification treatments have in common that solid wood is subjected to temperatures close to or above 200° C., for example 150 to 250° C., in particular 170 to 240° C., for several hours in an atmosphere with low oxygen content. By this thermal modification some mechanical properties are reduced but the dimensional stability and the biological durability of wood is increased without adding outside chemicals or biocides to the wood.

Also other wood preservatives may be used which generally increase the durability and resistance from being destroyed by insects or fungus.

In one embodiment, the resin is transparent or translucent. The wood chips embedded in or with the matrix are then visually discernible on the outer surface down to the depth of at least 0.25 mm, in particular at least 0.5 mm, for example at least 1 mm. This will give the surface of the compressed article a three-dimensional appearance.

In one embodiment of the invention compressed article is provided in one or multiples of preselected colours. This selection of colour can be done during the process of producing the solution mixture of wood chips and resin. The wood chips are being stained or coloured in any other suitable way before being added to the mixture with the thermosetting resin. In this embodiment, it is preferred to have a thermosetting resin that is transparent or translucent once hardened so that the colour of the wood chips confer to the compressed article the appearance of the preselected colour.

Embodiments of the present technology solve the problem conventionally associated with swelling of polymer-wood-composites when exposed to water. The material of the present compressed material significantly reduces absorption of water and therefore also swelling of the material. As pointed out above, the water absorbency is typically less than 2%, in particular less than 1%, for example less than 0.8% by weight upon immersion of an object according to the present technology into water over a time period of at least 168 hours at room temperature. This reduction in water absorbency and swelling of the wood chips make the material appealing as a building material conventionally placed in contact with water, thereby giving it wider industrial applications.

In one embodiment, the compressed article is dimensionally stable at a humidity varying in the range from 0.5 to 100%. Dimensional stability of the article relates to the structural integrity of the article when it is exposed to moisture. The structural integrity may be referred to the expansion of wood chips or splitting of the material or any other structural changes to the material.

In one embodiment, the thermosetting resin with which the wood chips are mixed is capable of penetrating into the wood chips, at least partially, already during mixing and at the latest when the wood chips are in contact with the polymer in the moulding process.

The density of the wood chips is significantly smaller than that of the polymer resin, which means that the overall density of the compressed article can be adjusted according to the amount of wood chips being added to the polymer matrix.

In one embodiment the compressed article has a density which is at least 1%, in particular 2 to 10%, smaller than the density of an article that is made of purely hardened thermoset polymer. The article would then have a volume and each partial volume would amount to at least 1% of the volume of the article that has a density which is at least 5%, in particular 10 to 40%, smaller than the density of the hardened thermoset polymer as such.

In embodiments of the present invention, the densities of the articles are typically in the range of about 800 to 995 kg/dm$^3$.

By using an open-mould moulding technique 3D (three-dimensional) surfaces can be created. The texture of the surface is dependent on the size of the used wood chips.

Different coatings for composite material may be used for all of the above disclosed embodiments. The coating material is selected depending on the applications. Thus, for example, products exposed to water and less aggressive chemicals at varying temperatures, such as sanitary articles, can be coated with a gelcoat. Such a gelcoat can be based on isophthalic/neopenthylglycol polyester resin. Such a gelcoat will give a transparent surface with good chemical resistance. Typically the coating, e.g. the gelcoat, will have a thickness of about 0.1 to 10 mm, in particular about 0.2 to 5 mm, for example 0.25 to 3 mm.

The following working example is presented by illustration and should not be considered limiting on the scope of the application.

EXAMPLE 1

30 parts by weight of the wood chips (sieved size 1-3 mm) and 70 parts by weight of an unhardened unsaturated polyester resin activated with a peroxide hardener were mixed to form a uniform mixture. The polyester resin and the hardener were mixed together prior adding wood chips to the resin solution. The mixture was thoroughly blended with a mixer to obtain an even distribution of the components. The mixture was then transferred to a compression three dimensional mould. The mixture was then compressed at a pressure of at least 500 kN and at a temperature of 40° C. whereby the resin cured and a compressed article was formed having a smooth surface. The density of the product was ~950 kg/m$^3$.

The compression moulded article was weighted and immersed into a water bath at a temperature of 25° C. After 168 hours, the article was removed from the water bath, the surface of the specimen was dried and the specimen then weighted. An increase of weight of less than 0.2% was found.

INDUSTRIAL APPLICABILITY

The present articles have a broad range of uses. In particular, it can be used in structures which are subject to continuous or occasional contact with water. Thus, the articles can be employed in the production of furniture for indoor as well as for outdoor use. It can be used in fixtures for kitchens and bathrooms. Examples include sinks, tiles, bathtubs, urinals and other similar plumbing fixtures. The present articles can also be used in marine structures, on boats and similar vessels, as part of hull or deck.

CITATION LIST

Patent Literature
JP03055974B2
JP2014008617A
JP2002036213A
EP2777238
U.S. 2013000248 A1
U.S. 2003046772 A1

The invention claimed is:

1. A compressed article formed from a composite material comprising a continuous matrix of a hardened thermoset polymer and, distributed within the matrix, wood chips which are at least partially encased by the thermoset polymer, and a gelcoat coating comprising a isophthalic and neopenthylglycol polyester resin, wherein the wood chips are platy particles having a planar surface and are at least partially aligned with the longest dimension in a plane parallel to an outer surface of the article, wherein the article has a planar surface, and said article having a water absorbency of less than 1% by weight upon immersion into water over a time period of at least 168 h at room temperature.

2. The compressed article of claim 1, wherein the thermoset polymer comprises a polyester resin, an epoxy resin, melamine formaldehyde resin, or melamine urea formaldehyde resin.

3. The compressed article according to claim 1, wherein the wood chips have a sieved size of 1 to 7.5 mm.

4. The compressed article according to claim 1, wherein the compressed article comprises 1 to 60 parts by weight of the wood chips per 100 parts by weight of the hardened thermoset polymer.

5. The compressed article according to claim 1, wherein the wood chips are at least partially impregnated with the thermoset polymer.

6. The compressed article according to claim 1, wherein the compressed article has a density which is 2 to 20% smaller than the density of the hardened thermoset polymer without the wood chips.

7. The compressed article according to claim 1, further comprising having a water absorbency of less than 0.5% by weight upon immersion into water over a time period of at least 168 h at room temperature when using wood chips having a sieved size between 0.5-3 mm.

8. The compressed article according to claim 1, wherein the wood chips have a sieved size of 0.5 to 5 mm.

9. The compressed article according to claim 1, wherein the compressed article comprises 10 to 40 parts by weight of the wood chips per 100 parts by weight of the hardened thermoset polymer.

10. The compressed article of claim 1, wherein the compressed article is a furniture piece, plumbing fixture, boat hull, sink, tile, bathtub, or urinal.

* * * * *